(12) United States Patent
Fukumoto et al.

(10) Patent No.: US 7,771,839 B2
(45) Date of Patent: Aug. 10, 2010

(54) ALUMINUM ALLOY BRAZING SHEET

(75) Inventors: Atsushi Fukumoto, Tokyo (JP); Akio Niikura, Tokyo (JP); Kenji Negura, Kariya (JP); Keiichi Okazaki, Kariya (JP); Tatsuo Ozaki, Kariya (JP); Toshihide Ninagawa, Kariya (JP)

(73) Assignees: Furukawa-Sky Aluminum Corp., Tokyo (JP); Denso Corporation, Aichi (JP)

( * ) Notice: Subject to any disclaimer, the term of this patent is extended or adjusted under 35 U.S.C. 154(b) by 916 days.

(21) Appl. No.: 11/567,418

(22) Filed: Dec. 6, 2006

(65) Prior Publication Data
US 2007/0166565 A1 Jul. 19, 2007

(30) Foreign Application Priority Data
Dec. 8, 2005 (JP) .............................. 2005-355155

(51) Int. Cl.
*B32B 15/20* (2006.01)
(52) U.S. Cl. ........................ 428/654; 428/933; 165/905
(58) Field of Classification Search ........................ None
See application file for complete search history.

(56) References Cited
U.S. PATENT DOCUMENTS 5,744,255 A * 4/1998 Doko et al. ................. 428/654
6,465,113 B2 * 10/2002 Yamada et al. .............. 428/654
6,555,251 B2 * 4/2003 Kilmer ........................ 428/654
2006/0141282 A1 * 6/2006 Ueda et al. .................. 428/650
2007/0246509 A1 * 10/2007 Koshigoe et al. ............ 228/101

FOREIGN PATENT DOCUMENTS

| JP | 04-036600 A | 2/1992 |
| JP | 06-073480 A | 3/1994 |
| JP | 06-212332 A | 8/1994 |
| JP | 08-246117 A | 9/1996 |
| JP | 08-283891 A | 10/1996 |
| JP | 2003-55727 A | 2/2003 |
| JP | 2005-505421 A | 2/2005 |
| JP | 2005-161383 A | 6/2005 |
| JP | 2005-297016 A | 10/2005 |

OTHER PUBLICATIONS

European Search Report dated Mar. 20, 2007 issued in corresponding European Application No. EP 06 02 5426.
Concise Explanation of Documents 1-5 and 7.

* cited by examiner

*Primary Examiner*—John J Zimmerman
(74) *Attorney, Agent, or Firm*—Westerman, Hattori, Daniels & Adrian, LLP

(57) ABSTRACT

An aluminum alloy brazing sheet which has a clad of a sacrificial anode material/a core alloy/an intermediate material/a filler alloy, wherein number density ratios $N_1/N_2$ and $N_1/N_3$ each are 1.5 or more, in which a number density ((the number of grains)/$\mu m^3$) of an intermetallic compound having a sphere-equivalent grain diameter of 0.1 μm or less present in the core alloy, the intermediate material, and the sacrificial anode material, is represented by $N_1$, $N_2$, and $N_3$, respectively.

2 Claims, No Drawings

ALUMINUM ALLOY BRAZING SHEET

FIELD OF THE INVENTION

The present invention relates to an aluminum alloy brazing sheet that can be used in a heat exchanger for an automobile, in particular, to an aluminum alloy brazing sheet that can be preferably used as a cooling water- or cooling medium-passage forming material of a heat exchanger, such as a radiator or a condenser.

BACKGROUND OF THE INVENTION

An aluminum alloy is lightweight and has high heat conductivity, and thus is used in a heat exchanger for an automobile, for example, a radiator, a condenser, an evaporator, a heater, or an intercooler. The heat exchanger for an automobile is mainly produced via a brazing method. In general, brazing is conducted at a high temperature of about 600° C., by using an Al—Si-based filler alloy. Thus, an aluminum alloy brazing sheet, having excellent brazing properties and having high strength after brazing and corrosion resistance, is required.

An aluminum alloy heat exchanger to be produced through brazing is formed of a corrugated fin for mainly conducting heat radiation and a tube for circulating cooling water or a cooling medium. In the case where the tube is penetrated through corrosion or fracture, the cooling water or cooling medium circulating inside the tube leaks. Thus, an aluminum alloy brazing sheet having excellent strength after brazing and corrosion resistance, is essential for extending a life of a product using the same.

In recent years, a demand for reduction in weight of an automobile has been increasing, and corresponding reduction in weight of an automobile heat exchanger has been required. Thus, reduction in thickness of each member forming the heat exchanger has been studied, since there is a need of an aluminum alloy brazing sheet having further improved strength after brazing and corrosion resistance.

Hitherto, a tube material of a heat exchanger in which cooling water circulates inside the tube, such as a radiator or a heater for an automobile, generally employs a three-layer tube material obtained by: cladding a sacrificial anode material, such as an Al—Zn-based alloy, on an inner surface of a core alloy, such as an Al—Mn-based alloy typified by a JIS 3003 alloy; and cladding a filler alloy, such as an Al—Si-based alloy, on an atmospheric side of the core alloy.

However, the mechanical strength after brazing of the clad material employing the JIS 3003 core alloy is about 110 MPa, which is insufficient.

For improving the strength after brazing, a three-layer clad tube material having Mg added to a core alloy is proposed (see JP-A-8-246117 ("JP-A" means unexamined published Japanese patent application), and JP-A-2003-55727, for example). However, the addition of Mg to the core alloy causes a reaction of a fluoride-based flux to be used in a Nocolok brazing method and Mg, leading to formation of a compound such as MgF, and thereby to significantly degrade brazing properties.

Further, there is proposed a tube material capable of preventing degradation of the brazing properties and having improved strength, which is obtained by adding Mg to a sacrificial anode material cladded to an inner surface of the tube, rather than to the core alloy (see JP-A-6-212332 and JP-8-283891, for example). Since the tube material contains Mg added to the sacrificial anode material, the tube material can be used as a material for a seam welded flat tube in which the sacrificial anode material is not in contact with a bonding surface, but the tube material cannot be used as a material for a flat tube in which a surface of the sacrificial anode material must be bonded through brazing.

Further, there is proposed a four-layer clad material in which an intermediate material is formed between a core alloy and a filler alloy of a three-layer clad material formed of a filler alloy, a core alloy, and a sacrificial anode material (see JP-A-6-73480, JP-T-2005-505421 ("JP-T" means published searched patent publication), and JP-A-2005-161383, for example). The four-layer clad material is improved in strength after brazing by using a material containing a large Mg content in the core alloy. Further, diffusion of Mg, which is added to the core alloy, into the filler alloy is suppressed by forming the intermediate material having a low Mg content between the filler alloy and the core alloy. Thus, degradation in brazing properties is prevented in the case where a Nocolok brazing method is used for the four-layer clad material.

SUMMARY OF THE INVENTION

In order to satisfy demands for reduction in thickness of an aluminum alloy brazing sheet, properties such as strength after brazing and corrosion resistance must be improved. However, conventional techniques have difficulties in assuring brazing properties with a small thickness, while attaining higher strength and corrosion resistance simultaneously.

The present invention contemplates providing an aluminum alloy brazing sheet having favorable brazing properties even in the case where a Nocolok brazing method is used, and having excellent strength after brazing and corrosion resistance, in particular, which can be preferably used as a fluid passage forming material of an automobile heat exchanger, in order to solve the problems in the conventional technique.

As a result of extensive study for solving the above-mentioned problems, the inventors of the present invention have found that a clad material having specific alloy composition and alloy structure can solve the problems. The present invention has been attained based on those findings.

According to the present invention, there is provided the following means:

(1) An aluminum alloy brazing sheet, comprising: a core alloy; an intermediate material cladded on one side of the core alloy; a sacrificial anode material cladded on the other side of the core alloy; and an Al—Si-based filler alloy cladded on the other side of the intermediate material, wherein the core alloy is an aluminum alloy containing 0.3 to 1.2% (mass %, the same applies the below) of Si, 0.3 to 1.2% of Cu, 0.5 to 2.0% of Mn, 0.2 to 1.5% of Mg, 0.5% or less of Fe, and containing one or more elements selected from the group consisting of 0.02 to 0.3% of Ti, 0.02 to 0.3% of V, 0.02 to 0.3% of Zr, and 0.02 to 0.3% of Cr, and the balance of Al and unavoidable impurities;

wherein the intermediate material is an aluminum alloy containing 1.2% or less of Si, 1.0% or less of Fe, 0.5 to 2.0% of Mn, and containing, if necessary, one or more elements selected from the group consisting of 1.0% or less of Cu, 0.02 to 0.3% of Ti, and 0.02 to 0.3% of V, and the balance of Al and unavoidable impurities; and wherein the sacrificial anode material is an aluminum alloy containing 1.0 to 6.0% of Zn, and containing, if necessary, one or more elements selected from the group consisting of 1.0% or less of Si, 2.0% or less of Mn, 0.02 to 0.3% of Ti, and 0.02 to 0.3% of V, and the balance of Al and unavoidable impurities.

(2) An aluminum alloy brazing sheet, comprising: a core alloy; an intermediate material cladded on one side of the core alloy; a sacrificial anode material cladded on the other side of the core alloy; and an Al—Si-based filler alloy cladded on the other side of the intermediate material, wherein number density ratios $N_1/N_2$ and $N_1/N_3$ each are 1.5 or more, in which a number density ((the number of grains)/μm$^3$) of an intermetallic compound having a sphere-equivalent grain diameter of 0.1 μm or less present in the core alloy, the intermediate material, and the sacrificial anode material, is represented by $N_1$, $N_2$, and $N_3$, respectively.

(3) The aluminum alloy brazing sheet according to the item (1) above, comprising: a core alloy; an intermediate material cladded on one side of the core alloy; a sacrificial anode material cladded on the other side of the core alloy; and an Al—Si-based filler alloy cladded on the other side of the intermediate material, wherein number density ratios $N_1/N_2$ and $N_1/N_3$ each are 1.5 or more, in which a number density ((the number of grains)/μm$^3$) of an intermetallic compound having a sphere-equivalent grain diameter of 0.1 μm or less present in the core alloy, the intermediate material, and the sacrificial anode material, is represented by $N_1$, $N_2$, and $N_3$, respectively.

(4) The aluminum alloy brazing sheet according to any of the items (1) to (3) above, wherein the aluminum alloy brazing sheet is for a heat exchanger Other and further features and advantages of the invention will appear more fully from the following description.

DETAILED DESCRIPTION OF THE INVENTION

Detailed description will be given of some preferred embodiments of the aluminum alloy brazing sheet of the present invention.

The aluminum alloy brazing sheet of the present invention is formed of a four-layer clad material, which is constituted by an aluminum alloy intermediate material cladded on one side of an aluminum alloy core alloy, an Al—Zn-based sacrificial anode material cladded on the other side of the core alloy, and an Al—Si-based filler alloy cladded on the other side of the intermediate material. Further, [I] the core alloy, the intermediate material, and the sacrificial anode material are formed of aluminum alloys of the specific metal components and alloying composition, respectively; or/and [II] the aluminum alloy brazing sheet has number density ratios $N_1/N_2$ and $N_1/N_3$ of 1.5 or more, where a number density ((the number of grains)/μm$^3$) of an intermetallic compound having a sphere-equivalent grain diameter (i.e. a diameter of a sphere having the same volume to an individual grain) of 0.1 μm or less present in an alloy material of the core alloy, the intermediate material, and the sacrificial anode material, is represented by $N_1$, $N_2$, and $N_3$, respectively.

The intermetallic compound having a sphere-equivalent grain diameter of 0.1 μm or less in an alloy material inhibits transferring or migration of dislocation, subgrain boundary, or recrystallization interface, and has an action of delaying recrystallization. A higher number density of the intermetallic compound having a sphere-equivalent grain diameter of 0.1 μm or less causes difficulties in recrystallization upon brazing. Separately, for suppressing erosion from being occurred upon brazing, a layer in contact with a filler alloy must completely recrystallize at a filler alloy melting temperature or lower, because a molten filler alloy diffuses via a processed structure at a high speed, to cause erosion.

The inventors of the present invention found that, in the case where number density ratios $N_1/N_2$ and $N_1/N_3$ are each 1.5 or more, wherein a number density ((the number of grains)/μm$^3$) of an intermetallic compound having a sphere-equivalent grain diameter of 0.1 μm or less present in the core alloy, the intermediate material, or the sacrificial anode material, is represented by $N_1$, $N_2$, or $N_3$, respectively, the intermediate material and the sacrificial anode material, which are layers in contact with the molten filler alloy, each recrystallize at a filler alloy melting temperature or lower, but the core alloy, which is not in direct contact with the molten filler alloy, can give a structure that does not recrystallize even after the completion of the brazing. Further, the intermediate material and the sacrificial anode material in contact with the molten filler alloy can provide a recrystallized structure (O tempered material) at a filler alloy melting temperature or lower, and thus erosion can be suppressed. The core alloy can provide a non-recrystallized structure (H tempered material) having a processed structure remained even after brazing.

For obtaining the number density ratios $N_1/N_2$ and $N_1/N_3$ of 1.5 or more, the core alloy, the intermediate material, and the sacrificial anode material each preferably have specific metal element components and alloy composition, as described in the below.

In conventional three-layer clad material and four-layer clad material, the core alloy has a recrystallized structure, and thus mechanical properties after brazing was the same as those of an O tempered material. However, in the four-layer clad material of the present invention, the core alloy has a non-recrystallized structure after brazing, and thus the mechanical properties after brazing can be the same as those of an H tempered material. As a result, the strength after brazing can remarkably be enhanced. In the case where the number density ratio is less than 1.5, the core alloy also has a recrystallized structure after brazing, and thus the strength after brazing cannot be improved.

Description will be given of reasons and addition ranges for component elements to be added to the core alloy, the intermediate material, and the sacrificial anode material, which form the aluminum alloy brazing sheet of the present invention, and description will also be given of the filler alloy.

(1. Core Alloy)

Si forms, together with Fe and Mn, an Al—Fe—Mn—Si-based compound, acts to cause dispersion strengthening or solid solution strengthening by forming a solid solution in a matrix, to thereby enhance mechanical strength. Further, Si improves the strength by reacting with Mg to form an $Mg_2Si$ compound. The Si content is within a range of 0.3 to 1.2% (% in a composition refers to mass %, the same applies below). If the Si content is less than 0.3%, it provides a small effect of Si; and if the Si content is more than 1.2%, it lowers a melting point of the core alloy and may be apt to cause melting. The Si content is preferably 0.5 to 1.0%.

Cu improves strength through solid solution strengthening, provides an electrically more positive potential to the core alloy, to increase a potential difference with potentials of the intermediate material, the sacrificial anode material, and a fin material, and improves the corrosion resistance effect by the sacrificial anode effect. The Cu content is within a range of 0.3 to 1.2%. If the Cu content is less than 0.3%, it provides a small effect of Cu; and if the Cu content is more than 1.2%, it may be apt to cause grain boundary corrosion. The Cu content is preferably 0.5 to 1.0%.

Mn has an effect of improving strength, brazing properties, and corrosion resistance, and providing an electrically more positive potential. The Mn content is 0.5 to 2.0%. If the Mn content is less than 0.5%, it provides a small effect of Mn; and if the Mn content is more than 2.0%, it is apt to allow formation of a coarse intermetallic compound upon casting, and to degrade plastic working properties. The Mn content is preferably 0.8 to 1.6%.

Mg has an effect of improving strength through $Mg_2Si$ precipitation. The Mg content is 0.2 to 1.5%. If the Mg content is less than 0.2%, it provides a small effect of Mg; and If the Mg content Is more than 1.5%, it lowers the melting point of the core alloy and may be apt to cause grain boundary corrosion. The Mg content is preferably 0.3 to 1.0%.

Fe is apt to form an intermetallic compound of a size which may serve as a recrystallization nucleus, and has an effect of lowering a recrystallization temperature. The Fe content is 0.5% or less, for providing a core alloy having a non-recrystallized structure after brazing. If the Fe content is more than 0.5%, it allows recrystallization of the core alloy after brazing, and reduces the strength. The Fe content is preferably 0.2% or less.

Ti improves strength through solid solution strengthening and improves corrosion resistance. The preferred Ti content is 0.02 to 0.3%. if the Ti content is less than 0.2%, it provides no effect of Ti; and if the Ti content is more than 0.3%, it is apt to allow formation of a coarse intermetallic compound and degrade plastic working properties. The Ti content is more preferably 0.1 to 0.2%.

V improves strength through solid solution strengthening and improves corrosion resistance. The preferred V content is 0.02 to 0.3%. If the V content is less than 0.02%, it provides no effect of V; and it the V content is more than 0.3%, it is apt to allow formation of a coarse intermetallic compound and degrade plastic working properties. The V content is more preferably 0.1 to 0.2%.

Zr and Cr form a fine intermetallic compound, to raise the recrystallization temperature, and thereby to easily provide a non-recrystallized structure after brazing. The contents of Zr and Cr each are preferably 0.02 to 0.3%. If the Zr/Cr content is less than 0.2%, it provides no effect of Zr and Cr; and if the Zr/Cr content is more than 0.3%, it is apt to allow formation of a coarse intermetallic compound and degrade plastic working properties. The contents of Zr and Cr each are more preferably 0.1 to 0.2%.

It is sufficient that at least one element of the Ti, V, Zr, and Cr is added to the core alloy.

(2. Intermediate Material)

Si forms, together with Fe and Mn, an Al—Fe—Mn—Si-based compound, acts to cause dispersion strengthening or solid solution strengthening by forming a solid solution In a matrix, to thereby enhance mechanical strength. Further, Si improves the strength, by reacting with Mg, which is diffused from the core alloy upon brazing, to form an $Mg_2Si$ compound. The Si content is within a range of 1.2% or less. If the Si content is more than 1.2%, it lowers the melting point of the core alloy and may easily cause melting. The Si content is preferably 1.0% or less.

Mn has an effect of improving strength, brazing properties, and corrosion resistance, and providing an electrically more positive potential. The Mn content is 0.5 to 2.0%. If the Mn content is less than 0.5%, it provides a small effect of Mn; and if the Mn content is more than 2.0%, it is apt to allow formation of a coarse intermetallic compound upon casting, and to degrade plastic working properties. The Mn content is preferably 0.8 to 1.6%.

Fe is apt to form an intermetallic compound of a size which may serve as a recrystallizaton nucleus, and has an effect of accelerating recrystallization upon heat-brazing. The Fe content is 1.0% or less. If the Fe content is more than 1.0%, it increases the number of intermetallic compounds, and the compounds serve as cathode origins, to thereby degrade corrosion resistance. The Fe content is preferably 0.6% or less.

Ti improves strength through solid solution strengthening and improves corrosion resistance. The preferred Ti content is 0.3% or less. If the Ti content is more than 0.3%, it is apt to allow formation of a coarse intermetallic compound and degrade plastic working properties. The Ti content is more preferably 0.1 to 0.2%.

V improves strength through solid solution strengthening and improves corrosion resistance. The preferred V content is 0.02 to 0.3%. If the V content is less than 0.02%, it provides no effect of V; and it the V content is more than 0.3%, it is apt to allow formation of a coarse intermetallic compound and degrade plastic working properties. The V content is more preferably 0.1 to 0.2%.

Cu improves strength through solid solution strengthening, provides an electrically more positive potential to the intermediate alloy, to increase a potential difference with potential of the fin material, and improves the corrosion resistance effect by the sacrificial anode effect. The Cu content is preferably 1.0% or less. If the Cu content is more than 1.0%, it decreases the potential difference with the core alloy and degrades corrosion resistance. The Cu content is more preferably 0.6% or less.

At least one element of the Ti, V, and Cu may be added to the intermediate material, if necessary.

(3. Sacrificial Anode Material)

Zn provides an electrically more negative potential to the sacrificial anode material, and improves corrosion resistance by the sacrificial anode effect by forming a potential difference between the sacrificial anode material and the core alloy. The Zn content is 1.0 to 6.0%. If the Zn content is less than 1.0%, it provides an insufficient effect of Zn; and if the Zn content is more than 6.0%, it increases an corrosion speed such that the sacrificial anode material is corroded and lost at an early stage, and degrades corrosion resistance. The Zn content is preferably 2.0 to 5.0%.

Si forms, together with Mn, an Al—Fe—Mn—Si-based compound, acts to cause dispersion strengthening or solid solution strengthening by forming a solid solution in a matrix, to thereby enhance mechanical strength. Further, Si improves the strength, by reacting with Mg, which is diffused from the core alloy upon brazing, to form an $Mg_2Si$ compound. The Si content is preferably 1.0% or less. If the Si content is more than 1.0%, it lowers the melting point of the core alloy and may easily cause melting. Further, Si provides an electrically more positive potential to the sacrificial anode material, and thus inhibits the sacrificial anode effect, to thereby degrade corrosion resistance. The Si content is more preferably 0.8% or less.

Mn improves strength and corrosion resistance. The Mn content is preferably 2.0% or less. If the Mn content is more than 2.0%, it is apt to allow formation of a coarse intermetallic compound upon casting, and to degrade plastic working properties. Further, Mn provides an electrically more positive potential to the sacrificial anode material, and thus inhibits the sacrificial anode effect, to thereby degrade corrosion resistance. The Mn content is more preferably 1.6% or less.

Ti improves strength through solid solution strengthening and improves corrosion resistance. The preferred Ti content is 0.3% or less. If the Ti content is more than 0.3%, it is apt to allow formation of a coarse intermetallic compound and degrade plastic working properties. The Ti content is more preferably 0.1 to 0.2%.

V improves strength through solid solution strengthening and improves corrosion resistance. The preferred V content is 0.02 to 0.3%. If the V content is less than 0.02%, it provides no effect of V; and it the V content is more than 0.3%, it is apt to allow formation of a coarse intermetallic compound and degrade plastic working properties. The V content is more preferably 0.1 to 0.2%.

At least one element of the Si, Mn, Ti, and V may be added to the sacrificial anode material, if necessary.

(4. Filler Alloy)

As the filler alloy, use may be made of an Al—Si-based filler alloy usually used, and is not particularly limited. For example, JIS 4343, 4045, 4047 alloys (Al-7 to 13 mass % Si) are preferred.

An aluminum alloy having the desired component composition described above for the filler alloy, the core alloy, the intermediate material, or the sacrificial anode material is melted, cast, machine finished, subjected to homogenization treatment, if necessary, and then rolled to a predetermined thickness through hot rolling, to thereby obtain a filler alloy sheet, a core alloy sheet, an intermediate material sheet, and a sacrificial anode material sheet, respectively. The sacrificial anode material sheet, the core alloy sheet, the intermediate material sheet, and the filler alloy sheet are laminated in the order given, subjected to soaking, and pressure bonded at 400 to 500° C. through hot rolling, to thereby produce a clad material. Then, the clad material is subjected to annealing and cold rolling in combination, to thereby obtain an aluminum alloy brazing sheet having a desired thickness.

Further, the thickness of the aluminum alloy brazing sheet of the present invention, and the cladding ratio (or thickness) of the respective layer each are not particularly limited. Generally, in the case where the brazing sheet of the present invention is used as a material for a tube in which a cooling water or cooling medium is to be circulated, the brazing sheet of the present invention can be made into a form of a thin brazing sheet having a thickness of about 0.3 mm or thinner. In that case, the thickness of the core alloy is generally in the range of approximately 0.050 to 0.200 mm, and the cladding ratio of any layer of the sacrificial anode material, intermediate material or filler alloy is generally in the range of approximately 7% to 20% (the thickness of the layer is generally in the range of approximately 0.020 to 0.050 mm). Alternatively, in the case where the brazing sheet of the present invention is used as a material for a plate, which provides a structure of a heat exchanger, by bonding with a tube, the brazing sheet of the present invention can be made into one having a thickness of about 1.2 mm or thinner. In that case, the thickness of the core alloy is generally in the range of approximately 0.100 to 1.100 mm, and the cladding ratio of any layer of the sacrificial anode material, intermediate material or filler alloy is generally in the range of approximately 2% to 10% (the thickness of the layer is generally in the range of approximately 0.020 to 0.120 mm).

The aluminum alloy brazing sheet has a small thickness, excellent mechanical strength and corrosion resistance, and good brazing properties, and thus can preferably be used for production of a lightweight heat exchanger for an automobile.

According to the present invention, it is possible to provide an aluminum alloy brazing sheet having a small thickness, excellent brazing properties such as fin bonding rate and erosion resistance, high mechanical strength after brazing, and good corrosion resistance on both the inner and outer surfaces. Further, the brazing sheet has a small thickness, is lightweight and has excellent heat conductivity as an automobile heat exchanger, and it has excellent corrosion resistance on atmospheric and cooling medium sides, and is capable of further extending a life of the heat exchanger.

The present invention will be described in more detail based on the following examples, but the invention is not intended to be limited thereto.

EXAMPLES

An alloy for a core alloy, intermediate material, or sacrificial anode material, having the metal components and composition as shown in Tables 1, 2, and 3, was cast through mold casting, machine finished on both sides, and subjected to homogenization treatment for the core alloy, the intermediate material, and the sacrificial anode material at a temperature as shown in Table 4. A 4045 alloy was used as a filler alloy, and the filler alloy, the intermediate material, and the sacrificial anode material were each rolled to a thickness of 6 mm through hot rolling. The alloy materials were combined with the core alloy of thickness 22 mm as shown in Table 4, and clad ratios of the filler alloy, the intermediate material, and the sacrificial anode material each were set to 15%. The resultant combination of materials was pressure bonded at 500° C. through hot rolling, to thereby obtain a four-layer clad material having a thickness of 3.5 mm. In the midway of cold rolling, intermediate annealing was conducted under the conditions of at 380° C. for 2 hours, as shown in Table 4, and the thus-clad material was cold rolled to a final sheet thickness of 0.25 mm at a final rolled (reduction) ratio 15%, to thereby obtain an H tempered sheet material.

Then, a part of the thus-prepared sheet material was used as a sample material, and the sample material was subjected to calculation of number density ratios of an intermetallic compound and evaluation of strength after brazing, corrosion resistance, and brazing properties by the methods described below. Table 5 shows the results.

(1) Number Density Ratios $N_1/N_2$ and $N_1/N_3$ of Intermetallic Compound Having Sphere-equivalent Grain Diameter of 0.1 µm or Less:

The number densities ((the number of grains)/µm$^3$) of the intermetallic compound having a sphere-equivalent grain diameter of 0.1 µm or less, which compound was present in the core alloy, the intermediate material, and the sacrificial anode material each forming the sample material, was found through observation by using a transmission electron microscope (TEM). First, each sample material to be tested was observed in ten visual fields, and an image in TEM photograph of each field was analyzed, to thereby calculate the size and density of the intermetallic compound. The density ratio of the intermetallic compound as shown in the table represents an average of the values obtained in the ten visual fields, respectively.

(2) Tensile Strength after Brazing:

After heat-brazing at 600° C. for 3 min, the sample was cooled at a cooling speed of 200° C./min and was left standing at room temperature for 1 week. The sample was subjected to a tensile strength test at normal temperature, under the conditions of tensile speed 10 mm/min and gauge length 50 mm, according to JIS Z2241.

(3) Fin Bonding Rate:

A fin material formed of a 3003 alloy was formed into a corrugated shape, and attached to a filler alloy surface of the sample material. Then, the resultant sample was immersed in an aqueous solution of a 5% fluoride-based flux, followed by drying at 200° C., and subjected to Nocolok brazing at 600° C. for 3 min. A test core having a fin bonding rate of 95% or more was designated to as a material having good brazing properties "○", and a test core having a fin bonding rate of less than 95% was designated to as a material having insufficient brazing properties "x"

(4) Erosion Resistance:
A test core was produced in the same manner as above. Sectional micro observation was conducted, and whether any erosion was occurred or not, was confined. A test core without erosion was designated to as "○", and a test core on which erosion was observed was designated to as "x".

(5) External Corrosion Resistance:
A test core was produced in the same manner as above, and a sacrificial anode material side of the test core was sealed. The resultant sealed test core was subjected to a CASS test (JIS H8681) for 500 hours, to measure a maximum pitting depth.

(6) Internal Corrosion Resistance:
After heat-brazing at 600° C. for 3 min in the same manner as for the tensile test sample, a filler alloy side of the sample was sealed. A cycle immersion test in hot water containing 500 ppm of $Cl^-$, 100 ppm of $SO_4^{2-}$, and 10 ppm of $Cu^{2+}$ at 88° C. for 8 hours and at room temperature for 16 hours, was conducted for 3 months, to measure the maximum pitting depth.

TABLE 1

| | Alloy symbol | Alloy composition (mass %) | | | | | | | | | | |
|---|---|---|---|---|---|---|---|---|---|---|---|---|
| | | Si | Fe | Cu | Mn | Mg | Cr | Zr | Zn | V | Ti | Al |
| Alloy for core alloy (According to this invention) | A1 | 0.5 | 0.15 | 0.5 | 1.1 | 0.6 | 0.1 | — | — | — | 0.15 | Balance |
| | A2 | 1.0 | 0.15 | 0.5 | 1.1 | 0.6 | 0.1 | 0.1 | — | — | 0.15 | Balance |
| | A3 | 1.2 | 0.15 | 0.5 | 1.1 | 0.6 | — | 0.1 | — | — | 0.15 | Balance |
| | A4 | 0.7 | 0.15 | 0.8 | 1.1 | 0.3 | — | 0.1 | — | 0.15 | — | Balance |
| | A5 | 0.5 | 0.15 | 0.8 | 1.1 | 0.6 | 0.1 | — | — | 0.15 | — | Balance |
| | A6 | 0.5 | 0.15 | 0.5 | 1.1 | 0.9 | 0.1 | — | — | 0.15 | — | Balance |
| | A7 | 0.5 | 0.15 | 0.3 | 1.1 | 1.2 | 0.1 | — | — | — | 0.15 | Balance |
| | A8 | 0.5 | 0.15 | 1.0 | 1.1 | 0.3 | — | 0.1 | — | — | — | Balance |
| | A9 | 0.5 | 0.15 | 0.5 | 0.5 | 0.6 | — | 0.1 | — | — | — | Balance |
| | A10 | 0.5 | 0.15 | 0.5 | 1.5 | 0.6 | 0.1 | 0.1 | — | — | 0.15 | Balance |
| Alloy for core alloy (for comparison) | A11 | 0.3 | 0.15 | 0.3 | 1.1 | 1.7 | — | — | — | — | 0.15 | Balance |
| | A12 | 0.5 | 0.15 | 0.5 | 1.1 | 0.1 | — | — | — | — | — | Balance |
| | A13 | 0.1 | 0.15 | 0.5 | 1.1 | 0.6 | 0.1 | — | — | — | 0.15 | Balance |
| | A14 | 0.5 | 0.15 | 1.5 | 0.3 | 0.6 | — | — | — | — | — | Balance |

TABLE 2

| | Alloy symbol | Alloy composition (mass %) | | | | | | | | | | |
|---|---|---|---|---|---|---|---|---|---|---|---|---|
| | | Si | Fe | Cu | Mn | Mg | Cr | Zr | Zn | V | Ti | Al |
| Intermediate material alloy (According to this invention) | B1 | 0.7 | 0.15 | 0.2 | 1.1 | — | — | — | — | — | 0.15 | Balance |
| | B2 | 0.7 | 0.15 | 0.5 | 1.1 | — | — | — | — | — | 0.15 | Balance |
| | B3 | 0.3 | 0.15 | 0.5 | 1.1 | — | — | — | — | 0.15 | — | Balance |
| | B4 | 1.0 | 0.15 | — | 1.1 | — | — | — | — | — | 0.15 | Balance |
| | B5 | 0.7 | 0.15 | 0.2 | 0.5 | — | — | — | — | — | — | Balance |
| Intermediate material alloy (for comparison) | B6 | 1.5 | 0.15 | 0.5 | 1.1 | — | — | — | — | — | — | Balance |
| | B7 | 0.7 | 0.15 | 1.2 | 1.1 | — | — | — | — | — | — | Balance |
| | B8 | 0.1 | 0.15 | — | 2.2 | — | — | — | — | — | — | Balance |

TABLE 3

| | Alloy symbol | Alloy composition (mass %) | | | | | | | | | | |
|---|---|---|---|---|---|---|---|---|---|---|---|---|
| | | Si | Fe | Cu | Mn | Mg | Cr | Zr | Zn | V | Ti | Al |
| Sacrificial anode material alloy (According to this invention) | C1 | 0.3 | 0.12 | — | 0.5 | — | — | — | 2.0 | — | 0.15 | Balance |
| | C2 | 0.3 | 0.12 | — | 0.5 | — | — | — | 3.5 | — | 0.15 | Balance |
| | C3 | 0.3 | 0.12 | — | 0.5 | — | — | — | 5.0 | — | 0.15 | Balance |
| | C4 | 0.7 | 0.12 | — | 0.5 | — | — | — | 3.5 | 0.15 | — | Balance |
| | C5 | 0.7 | 0.12 | — | 1.1 | — | — | — | 3.5 | 0.15 | — | Balance |
| Sacrificial anode material alloy (for comparison) | C6 | 0.7 | 0.12 | — | 0.5 | — | — | — | 0.8 | — | — | Balance |
| | C7 | 0.7 | 0.13 | — | 0.5 | — | — | — | 7.0 | — | — | Balance |
| | C8 | 1.5 | 0.14 | — | 0.5 | — | — | — | 3.5 | — | — | Balance |

TABLE 4

| Test sample No. | | Alloy symbol | | | Manufacturing process | | | |
|---|---|---|---|---|---|---|---|---|
| | | Core alloy | Intermediate material | Sacrificial anode material | Homogenization treatment temperature (° C.) | | Intermediate annealing temperature (° C.) | Intermediate annealing time (h) | Final cold-rolled ratio (%) |
| | | | | | Core alloy | Intermediate material, Sacrificial anode material | | | |
| This invention | 1 | A1 | B1 | C2 | 450 | 600 | 380 | 2 | 15 |
| | 2 | A2 | B1 | C2 | 450 | 600 | 380 | 2 | 15 |
| | 3 | A3 | B1 | C2 | 450 | 600 | 380 | 2 | 15 |
| | 4 | A4 | B1 | C2 | 450 | 600 | 380 | 2 | 15 |
| | 5 | A5 | B1 | C2 | 450 | 600 | 380 | 2 | 15 |
| | 6 | A6 | B1 | C2 | 450 | 600 | 380 | 2 | 15 |
| | 7 | A7 | B1 | C2 | 450 | 600 | 380 | 2 | 15 |
| | 8 | A8 | B1 | C2 | 450 | 600 | 380 | 2 | 15 |
| | 9 | A9 | B1 | C2 | 450 | 600 | 380 | 2 | 15 |
| | 10 | A10 | B1 | C2 | 450 | 600 | 380 | 2 | 15 |
| | 11 | A10 | B2 | C2 | 450 | 600 | 380 | 2 | 15 |
| | 12 | A10 | B3 | C2 | 450 | 600 | 380 | 2 | 15 |
| | 13 | A10 | B4 | C2 | 450 | 600 | 380 | 2 | 15 |
| | 14 | A10 | B5 | C2 | 450 | 600 | 380 | 2 | 15 |
| | 15 | A10 | B1 | C1 | 450 | 600 | 380 | 2 | 15 |
| | 16 | A10 | B1 | C3 | 450 | 600 | 380 | 2 | 15 |
| | 17 | A10 | B1 | C4 | 450 | 600 | 380 | 2 | 15 |
| | 18 | A10 | B1 | C5 | 450 | 600 | 380 | 2 | 15 |
| Comparative example | 19 | A11 | B1 | C2 | 450 | 600 | 380 | 2 | 15 |
| | 20 | A12 | B1 | C2 | 450 | 600 | 380 | 2 | 15 |
| | 21 | A13 | B1 | C2 | 450 | 600 | 380 | 2 | 15 |
| | 22 | A14 | B1 | C2 | 450 | 600 | 380 | 2 | 15 |
| | 23 | A10 | B6 | C2 | 450 | 600 | 380 | 2 | 15 |
| | 24 | A10 | B7 | C2 | 450 | 600 | 380 | 2 | 15 |
| | 25 | A10 | B8 | C2 | 450 | 600 | 380 | 2 | 15 |
| | 26 | A10 | B1 | C6 | 450 | 600 | 380 | 2 | 15 |
| | 27 | A10 | B1 | C7 | 450 | 600 | 380 | 2 | 15 |
| | 28 | A10 | B1 | C8 | 450 | 600 | 380 | 2 | 15 |

TABLE 5

| Test sample No. | | $N_1/N_2$ | $N_1/N_3$ | Tensile strength after brazing (N/mm$^2$) | Fin bonding rate | Erosion resistance | Maximum pitting depth (mm) | |
|---|---|---|---|---|---|---|---|---|
| | | | | | | | Outer side | Inner side |
| This invention | 1 | 3.0 | 4.0 | 215 | ○ | ○ | 0.09 | 0.10 |
| | 2 | 4.0 | 5.3 | 227 | ○ | ○ | 0.08 | 0.09 |
| | 3 | 3.3 | 4.3 | 234 | ○ | ○ | 0.08 | 0.11 |
| | 4 | 3.3 | 4.3 | 205 | ○ | ○ | 0.06 | 0.11 |
| | 5 | 3.0 | 4.0 | 212 | ○ | ○ | 0.08 | 0.12 |
| | 6 | 3.3 | 4.3 | 233 | ○ | ○ | 0.11 | 0.12 |
| | 7 | 3.5 | 4.7 | 225 | ○ | ○ | 0.11 | 0.13 |
| | 8 | 2.8 | 3.7 | 207 | ○ | ○ | 0.07 | 0.11 |
| | 9 | 3.0 | 4.0 | 215 | ○ | ○ | 0.08 | 0.10 |
| | 10 | 3.3 | 4.3 | 218 | ○ | ○ | 0.08 | 0.11 |
| | 11 | 3.3 | 4.3 | 220 | ○ | ○ | 0.12 | 0.11 |
| | 12 | 3.8 | 4.3 | 217 | ○ | ○ | 0.12 | 0.11 |
| | 13 | 2.6 | 4.3 | 210 | ○ | ○ | 0.07 | 0.12 |
| | 14 | 4.3 | 4.3 | 210 | ○ | ○ | 0.07 | 0.11 |
| | 15 | 3.3 | 4.3 | 217 | ○ | ○ | 0.08 | 0.14 |
| | 16 | 3.3 | 4.3 | 217 | ○ | ○ | 0.08 | 0.09 |
| | 17 | 3.3 | 3.6 | 219 | ○ | ○ | 0.07 | 0.13 |
| | 18 | 3.3 | 3.3 | 221 | ○ | ○ | 0.08 | 0.11 |
| Comparative example | 19 | 1.4 | 2.0 | 204 | X | X | 0.14 | 0.19 |
| | 20 | 1.3 | 1.4 | 156 | ○ | ○ | 0.06 | 0.09 |
| | 21 | 2.3 | 3.0 | 193 | ○ | ○ | 0.08 | 0.10 |
| | 22 | 1.4 | 2.0 | 227 | X | X | 0.12 | 0.18 |
| | 23 | 2.6 | 4.3 | 219 | ○ | X | 0.18 | 0.12 |
| | 24 | 3.3 | 4.3 | 223 | X | X | Penetration | 0.10 |
| | 25 | 1.3 | 4.3 | 198 | ○ | X | 0.13 | 0.09 |
| | 26 | 3.3 | 3.6 | 217 | ○ | ○ | 0.09 | Penetration |
| | 27 | 3.3 | 3.6 | 219 | ○ | ○ | 0.09 | Penetration |
| | 28 | 3.3 | 2.8 | 219 | ○ | X | 0.10 | Penetration |

As is apparent from Table 5, the test material Nos. 1 to 18, as examples according to the present invention, each had a sufficiently high tensile strength after brazing of 200 N/mm$^2$ or higher, was excellent in brazing properties, such as the fin bonding rate and erosion resistance, and was good in both the external (corresponding to an atmospheric side of a heat exchanger) and internal (corresponding to a cooling medium side) corrosion resistance.

Contrary to the above, the test material Nos. 20, 21, and 25, as comparative examples, each had a tensile strength after brazing of less than 200 N/mm$^2$, which was quite lower than those of the examples according to the present invention. The test material Nos. 20 and 21 each had poorly low mechanical strength, due to the too small addition amount(s) of Si or/and Mg, each of which is an element to contribute to age-hardening. Further, another reason of the lowered mechanical strength of the test material No. 20, is assumed that the material had insufficient addition amounts of elements to be added to the core alloy, and the number density ratio(s) $N_1/N_2$ or/and $N_1/N_3$ of the intermetallic compound having a sphere-equivalent grain diameter of 0.1 μm or less was less than 1.5, and thus the core alloy recrystallized after brazing. The test material No. 25 had an excessive Mn addition amount to the intermediate material, and thus formed a coarse intermetallic compound, to thereby have poorly low mechanical strength.

In the test material Nos. 19, 22, 23, 24, 25, and 28, the fin bonding rate was low, or erosion was occurred, due to the Mg added to the core alloy or other cause, and these samples for comparison each had poor brazing properties. In the test material Nos. 24, 26, 27, and 28, penetration (through-hole) corrosion was occurred either or both of the outer side or/and the inner side of the sample.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An aluminum alloy brazing sheet, comprising: a core alloy; an intermediate material cladded on one side of the core alloy; a sacrificial anode material cladded on the other side of the core alloy; and an Al-Si-based filler alloy cladded on the other side of the intermediate material, wherein the core alloy is an aluminum alloy containing 0.3 to 1.2% (mass %, the same applies the below) of Si, 0.3 to 1.2% of Cu, 0.5 to 2.0% of Mn, 0.2 to 1.5% of Mg, 0.5% or less of Fe, and containing one or more elements selected from the group consisting of 0.02 to 0.3% of Ti, 0.02 to 0.3% of V, 0.02 to 0.3% of Zr, and 0.02 to 0.3% of Cr, and the balance of Al and unavoidable impurities;

wherein the intermediate material is an aluminum alloy containing 1.2% or less of Si, 1.0% or less of Fe, 0.5 to 2.0% of Mn, and containing, optionally, one or more elements selected from the group consisting of 1.0% or less of Cu, 0.02 to 0.3% of Ti, and 0.02 to 0.3% of V, and the balance of Al and unavoidable impurities;

wherein the sacrificial anode material is an aluminum alloy containing 1.0 to 6.0% of Zn, and containing, optionally, one or more elements selected from the group consisting of 1.0% or less of Si, 2.0% or less of Mn, 0.02 to 0.3% of Ti, and 0.02 to 0.3% of V, and the balance of Al and unavoidable impurities, and wherein number density ratios $N_1/N_2$ and $N_1/N_3$ each are 1.5 or more, in which a number density ((the number of grains)/μm$^3$) of an intermetallic compound having a sphere-equivalent grain diameter of 0.1 μm or less present in the core alloy, the intermediate material, and the sacrificial anode material, is represented by $N_1$, $N_2$, and $N_3$, respectively.

2. The aluminum alloy brazing sheet according to claim 1, wherein the aluminum alloy brazing sheet is for a heat exchanger.

* * * * *